United States Patent [19]

Sweetman

[11] Patent Number: 5,063,030

[45] Date of Patent: Nov. 5, 1991

[54] PROCESS AND APPARATUS FOR REMOVING ORGANIC CONTAMINANTS FROM A FLUID

[76] Inventor: Robert J. Sweetman, 4612 Thornhurst Dr., Olney, Md. 20832

[21] Appl. No.: 490,376

[22] Filed: Mar. 8, 1990

[51] Int. Cl.$^5$ .................. B01J 19/08; B01J 19/12; B01J 19/00
[52] U.S. Cl. .................. 422/189; 422/186; 422/186.07; 422/186.12; 204/157.15; 204/158.2
[58] Field of Search .............. 422/186, 186.07, 186.08, 422/186.1, 186.14, 186.18, 186.19, 186.3, 186.15, 187

[56] References Cited

U.S. PATENT DOCUMENTS

| | | | |
|---|---|---|---|
| 2,941,265 | 6/1960 | Isenberg et al. | 422/121 |
| 3,235,325 | 2/1966 | Storchheim | 422/121 |
| 3,313,971 | 4/1967 | Nagy | 313/542 |
| 4,036,181 | 7/1977 | Matovich | 123/3 |
| 4,244,712 | 1/1981 | Tongret | 55/124 |
| 4,279,865 | 7/1981 | Layakhevich et al. | 422/187 |
| 4,619,763 | 10/1986 | O'Brien | 210/177 |
| 4,734,108 | 3/1988 | Cox et al. | 55/84 |
| 4,780,287 | 10/1988 | Zeff et al. | 422/186.3 |
| 4,897,246 | 1/1990 | Peterson et al. | 422/186.3 |
| 4,952,376 | 8/1990 | Peterson | 422/186.3 |
| 4,978,508 | 12/1990 | Hansen | 422/186.08 |

OTHER PUBLICATIONS

Perry et al., "Chemical Engineer's Handbook", 5th ed., McGraw-Hill Book Co., 1973.
McCabe et al., "Unit Operations of Chemical Engineering", 3rd ed., McGraw-Hill Book Co., 1976.

Primary Examiner—Brooks H. Hunt
Assistant Examiner—Daniel J. Jenkins
Attorney, Agent, or Firm—Shlesinger, Arkwright & Garvey

[57] ABSTRACT

A process and apparatus for removing organic contaminants from a fluid includes providing a fluid containing at least one type of organic pollutant molecules that have the characteristics of reacting generally reluctantly with an oxidizing agent at room temperature. The organic pollutant molecules have an initial substantially stable, non-reacting and unexcited molecular energy level state. The fluid is then exposed to a wave-form light energy source so as to upset the initial molecular energy state to reach a second substantially unstable, reacting and excited molecular energy state of the organic pollutant molecules. The fluid is exposed to an oxidizing agent, while keeping the organic pollutant molecules in the second molecular energy level state, for a time period sufficient to thoroughly oxidize the organic pollutant molecules. The fluid, which is substantially free of the organic pollutant molecules, is then discharged to the atmosphere.

20 Claims, 4 Drawing Sheets

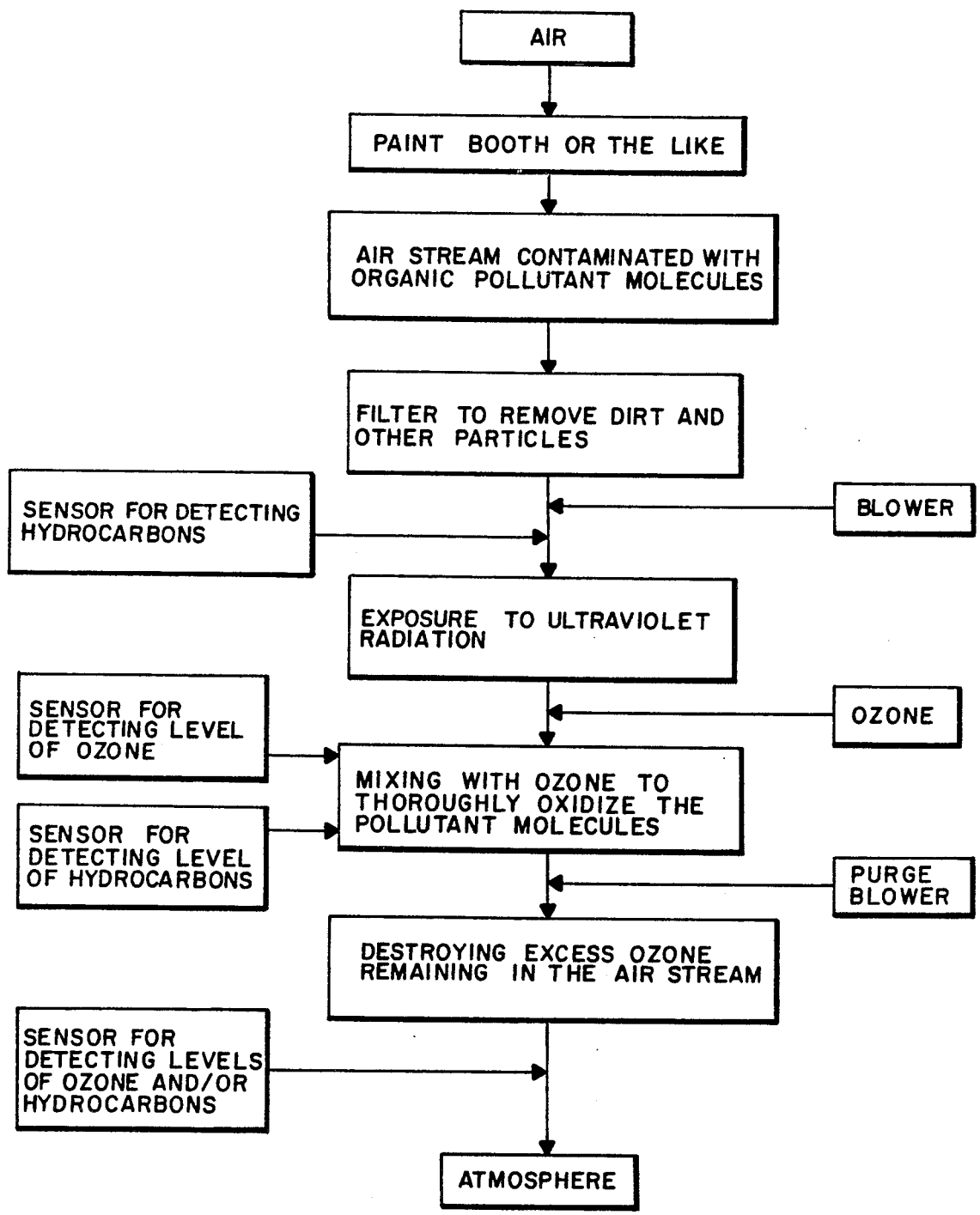
FIG_7

PROCESS AND APPARATUS FOR REMOVING ORGANIC CONTAMINANTS FROM A FLUID

FIELD AND HISTORICAL BACKGROUND OF THE INVENTION

The present invention is directed to a process and apparatus for removing organic contaminants from a fluid, and more particularly to a process for oxidizing the aromatic hydrocarbon contaminants molecules in a fluid by first exposing the same to ultraviolet radiation.

In modern times, as technological advances take place and the industries continue to grow, more and more industrial waste products pollute the air. The contaminants are released in the air from various industrial and other sources, such as manufacturing and processing plants, combustion of various organic fuels, the use of various chemicals in different types of industries, etc. The contaminants may be more or less odorous, pungent, noxious, and may be hazardous to health. Lately, the problem of air pollution has been become a growing concern among the many, and especially the environmentalists.

Various procedures have devised and used to purify air with some success, and examples of a few such systems are disclosed in U.S. Pat. Nos. 2,941,265; 3,235,325; 3,313,971; 4,244,712; and 4,734,108. However, conventional systems are not fully satisfactory in that they require the use of expensive equipment, and/or materials, which are complex in design and construction, generally inefficient and do not remove the contaminants that react generally reluctantly with an oxidizing agent at room temperature.

Accordingly, there is a need in the art for a process and an apparatus for removing various organic contaminants from a fluid that is simple in design and construction, inexpensive to manufacture, and destroys the contaminants that generally do not react with an oxidizing agent at room temperature.

OBJECTS AND SUMMARY OF THE INVENTION

The principal object of the present inVention is to provide a process and an apparatus for removing organic contaminants from a fluid which does not suffer from the disadvantages associated with conventional systems.

Another object of the present invention is to provide a process which is effective in removing organic contaminants that react generally reluctantly with an oxidizing agent or the like at room temperature.

Yet another object of the present invention is to provide a process for removing organic contaminants from a fluid which readily and effectively decomposes the contaminant molecules into carbon dioxide and water.

Still yet another object of the present invention is to provide a process for removing organic contaminants from a fluid which effectively uses substantial output radiation of a high energy source, such as an ultraviolet light source.

An additional object of the present invention is to provide a process for removing organic contaminants from a fluid which uses the ultraviolet light to excite organic molecules to more rapidly oxidize for complete destruction.

An additional object of the present invention is to provide an apparatus which removes organic contaminants from a fluid, effectively, efficiently and substantially completely.

Yet an additional object of the present invention is to provide an apparatus for removing organic contaminants from a fluid which requires relatively low initial equipment costs and substantially lower operating costs.

In summary, the main object of the present invention is to provide a process and an apparatus for removing organic contaminants, especially aromatic hydrocarbons, from a fluid which react generally reluctantly with a reagent at room temperature.

BRIEF DESCRIPTION OF THE DRAWINGS

The above and other objects and advantages and novel features of the present invention will become apparent from the following detailed description of the preferred embodiment of the present invention illustrated in the accompanying drawings, in which:

FIG. 7 is a flow-chart of the process of the invention.

DETAILED DESCRIPTION OF THE INVENTION

Figure 1:
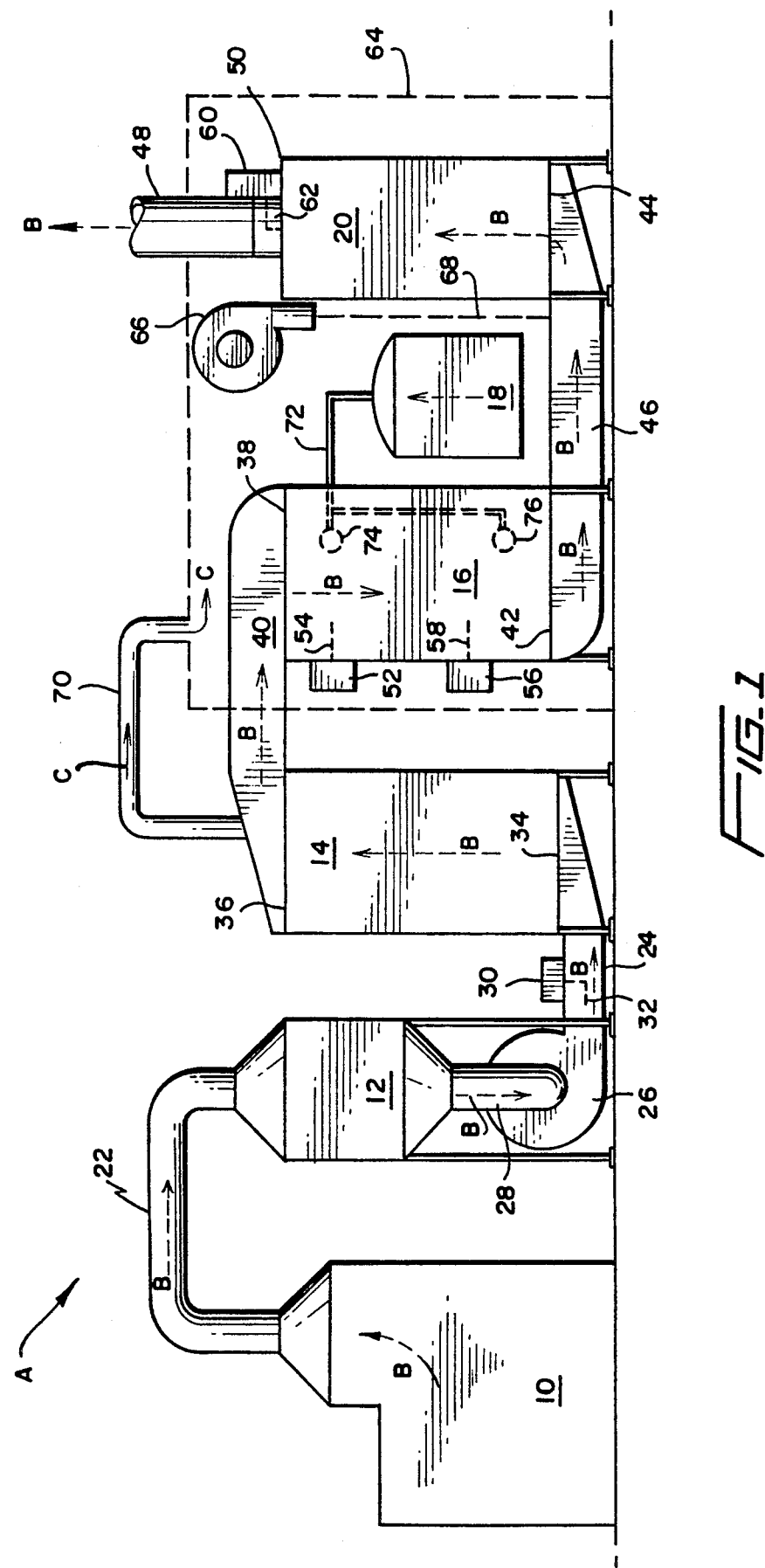
FIG. 1 is a simplified illustration of the apparatus of the present invention.

The apparatus A of the present invention, shown in FIG. 1, includes, in succession, contaminated air collection chamber 10, filter mechanism 12, photoexcitation unit 14, mixing chamber 16, conventional ozone generator 18, and unit 20 for destructing excess ozone remaining in the air. The air collection chamber 10 and filter mechanism 12 are connected by conduit 22. The filter mechanism 12, on the other hand, is further connected with photoexcitation unit 14 by conduit 24. An exhaust blower 26 is placed in passageway 28 leading from filter mechanism 12 to conduit 24 for providing sufficient pressure to force the contaminated air (shown by broken-line arrows B) through the apparatus A. The filter mechanism 12 is provided so as to prevent dirt or the like particles from entering into the apparatus A and adversely affecting the efficiency and the functioning thereof.

A hydrocarbon sensor 30 is positioned adjacent exhaust blower 26 and includes probe 32 that extends into conduit 24 for detecting the presence of hydrocarbons in the incoming air stream. The conduit 24 feeds the contaminated air into photoexcitation unit 14 from the bottom 34 thereof for exposure to ultraviolet light therein. The air leaving photoexcitation unit 14 from its top 36 thereof is fed into mixing chamber 16 at the top end 38 via conduit 40 and leaves mixing chamber 16 from bottom 42 thereof. As described below, it is critical that the contaminant molecules that are excited by the ultraviolet light, remain in that excited state until they are thoroughly mixed with the oxidizing agent in chamber 16. Accordingly, the distance between the unit 14 and chamber 16 is kept from about one-half to about one hundred feet and the velocity of air stream is kept at about 2,000 to about 2500 fpm. The air leaving mixing chamber 16 is fed into ozone destruct unit 20 from bottom end 44 thereof via conduit 46. The air is then vented to the atmosphere via conduit 48 located at top end 50 of unit 20.

The mixing chamber 16 includes sensor 52 with probe 54 extending therein adjacent top end 38 thereof for measuring the level of ozone in the air stream. Another sensor 56 with probe 58 is located downstream of sensor 52 for detecting the presence of any hydrocarbons in the air stream prior to leaving the mixing chamber 16. Another sensor 60 with probe 62 is located adjacent top end 50 of ozone destruct unit 20 for detecting the presence of residual hydrocarbons and/or any excess ozone remaining in the air being discharged to the atmosphere.

As shown in FIG. 1, mixing chamber 16, ozone generator 18 and ozone destruct unit 20 are separated from the atmosphere by enclosure 64, as ozone can be hazardous even in moderate concentrations. A blower 66 creates a negative pressure in the enclosure 64, and louvers or other openings (not shown) which are provided in the enclosure walls to allow the air to flow in an purge the atmosphere on a continuous basis. This exhaust blower 66 also draws out the air used to cool the UV light sources in the photoexcitation unit 14. The air discharged from the exhaust blower 66 is ducted into the unit 20 by line 68 feeding into conduit 46 to destroy any ozone it may contain.

In smaller systems, it may be practical to utilize ozone-producing UV light sources instead of an ozone generator. These light sources have special quartz envelopes which transmit ozone producing wavelengths of UV light. While the quantity of ozone produced may be small compared to an ozone generator, the reduction in size, complexity, and cost may be desirable for a unit which does not require a large amount of ozone production.

In FIG. 1, reference numeral 70 designates vent ducts for exhausting out the air leaving photoexcitation unit 14 which is used for cooling the ultraviolet light sources, described below. (In FIGS. 1-5, the arrows B with broken lines indicate the flow of contaminated air into and out from apparatus A and the solid-line arrows C show the flow of air used in connection with the cooling of the ultraviolet light sources.) The ozone generator 18 feeds into mixing chamber 16 via line 72 that branches out to be connected to upper and lower sets of manifolds 74 and 76.

Figure 2:
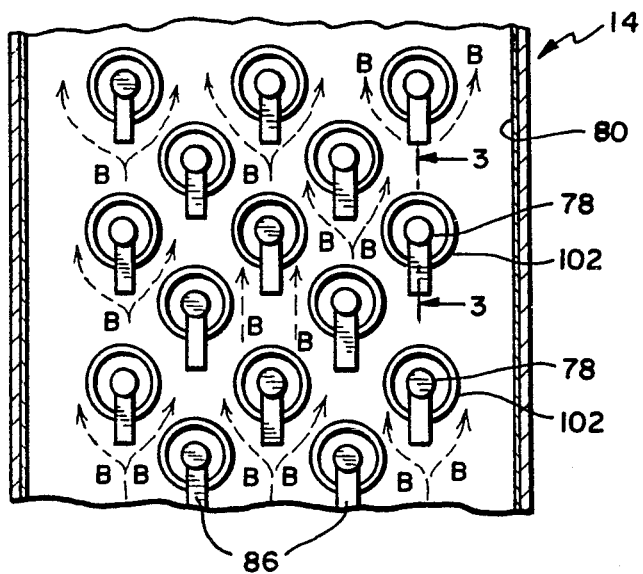
FIG. 2 is a partial enlarged longitudinal sectional view of the photoexcitation unit of the apparatus shown in FIG. 1.

As shown in FIG. 2, photoexcitation unit 14 includes ultraviolet light lamps 78 placed perpendicularly in the flow path of the contaminated air flowing upwardly therethrough. A suitable ultraviolet reflector material 80 covers the walls of the photoexcitation unit 14 to reflect the ultraviolet light back into the air stream for thereby improving the overall efficiency of lamps 78. The lamps that can be used in the present invention, include low pressure mercury (germicidal) lamps having approximately 90% of their output at about 254 nanometers, antimony-iodide or other metal halide lamps having substantially all of their output at between about 200-400 nanometers, and conventional medium pressure mercury lamps, including arc and electrodeless broad-band sources. It is, however, preferable to use the narrow-band ultraviolet light sources, as the broad-band light sources require higher operating costs and greater initial equipments costs.

Figure 3:
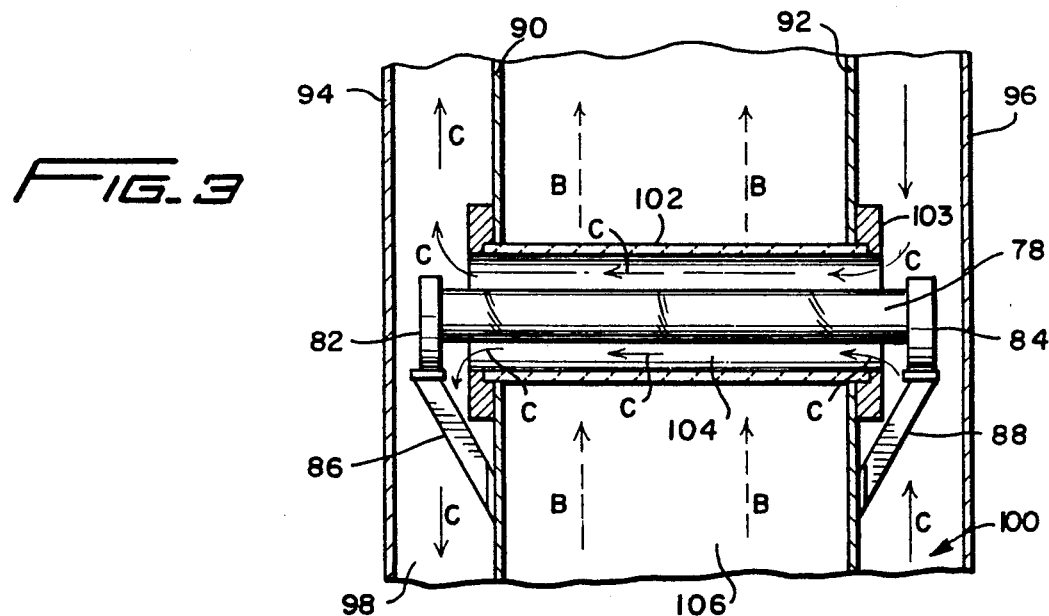
FIG. 3 is a partial enlarged sectional view taken along line 3—3 of FIG. 2.

As shown in FIG. 3, each lamp 78 is supported at its ends 82 and 84 on support braces 86 and 88. The support braces 86 and 88 are, on the other hand, mounted on the inner end walls 90 and 92 of unit 14. The inner walls 90 and 92 extend parallel to outer sidewalls 94 and 96 of unit 14 and form passageways or plenums 98 and 100 therebetween. While the lamps 78 are shown in FIG. 3 to be positioned perpendicular to the stream of the contaminated air, it is well within the scope of the invention to place the same in parallel thereto.

A quartz tube 102 surrounds each lamp 78 and is mounted by conventional means 103 on inner end walls 90 and 92. Each tube 102 has a diameter substantially larger than the diameter of lamp 78 and forms a circular passage 104 therebetween. As shown by arrows C in FIG. 3, cooling air is blown from pressure plenum 100 to passageways 104 and is vented out through exhaust plenum 98. This air is forced through the passageway 104 surrounding corresponding lamps 78 in order to cool the ultraviolet lamps 78 and to maintain a pressure balance between chamber 106 of photoexcitation unit 18 and passageways 104.

Figure 4:
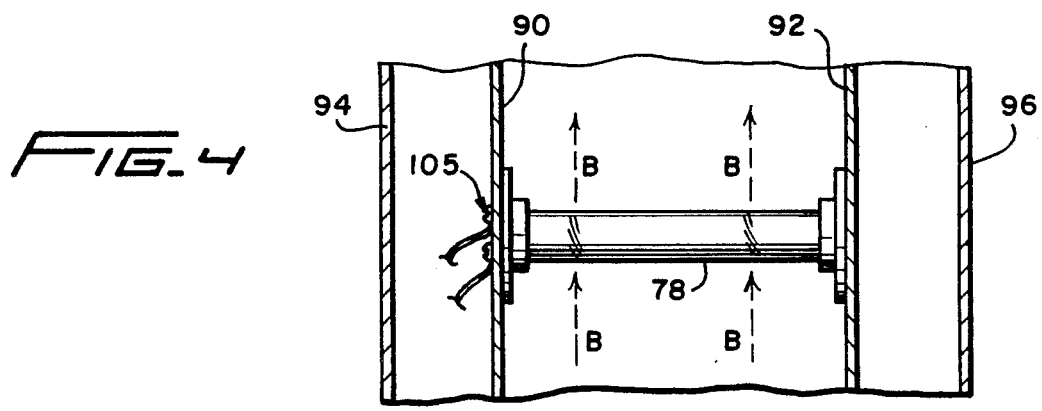
FIG. 4 is a view similar to FIG. 3, without the quartz tubes around the ultraviolet light sources.

It should be noted that the provision of quartz tubes 102 around ultraviolet lamps 78 is optional and as shown in FIG. 4, lamps 78 may be directly mounted by conventional mechanical means 105 on inner end walls 90 and 92 so as to be directly exposed to the contaminated air stream. The provision of quartz tubes 102 would be necessary in the circumstances where the concentration of a particular hydrocarbon is close to the lower explosive limits for that particular hydrocarbon. In that situation, the quartz tubes 102 would isolate the potentially explosive hydrocarbon-air mixture from being exposed to sparks which may be generated by the ultraviolet lamps 78. In addition, the quartz tubes 102 prevent the lamps 78 from being overcooled by the stream of high velocity cooling air passing by lamps 78. As one of ordinary skill in the art would appreciate, the efficiency of lamps 78 would be adversely affected in that situation.

It should be noted, however, that the contaminated air does not flow at all through the circular passageways 104, if quartz tubes 102 are used in conjunction with lamps 78.

Figure 5:
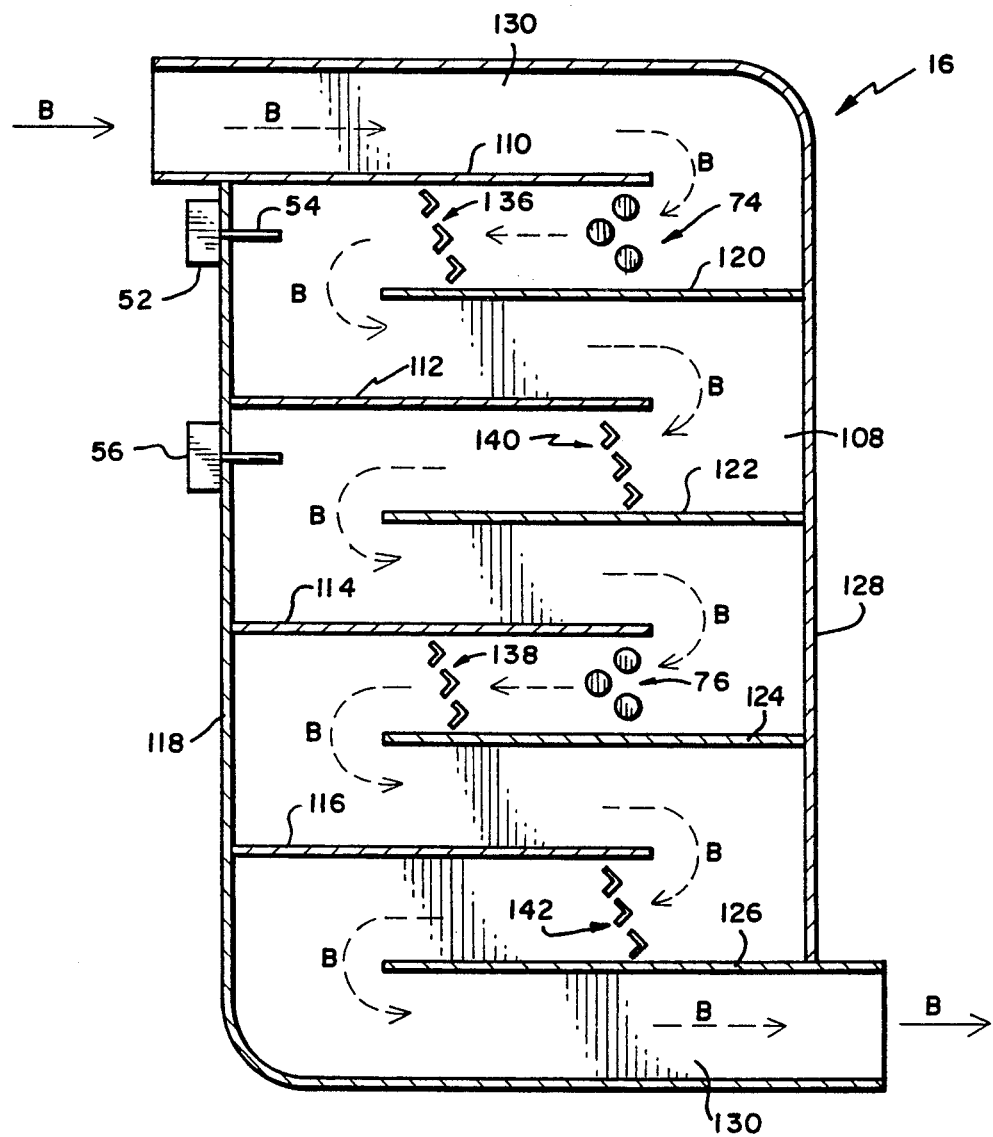
FIG. 5 is a partial enlarged longitudinal sectional view of the ozone mixing chamber of the apparatus shown in FIG. 1.

As shown in FIG. 5, mixing chamber 16 includes therein cantilevered partitions which define a retroverted flow passageway 108. Partitions 110, 112, 114 and 116 extend from left wall 118 of chamber 116 and partitions 120, 122, 124 and 126 extend from right wall 128 thereof. The retroverted flow passageway 108 allows a substantially long dwelling time for the contaminated air within 10 mixing chamber 16 and therefore facilitates complete mixing thereof with the oxidizing agent, such as ozone, supplied by upper and lower manifold sets 74 and 76. As shown in FIG. 5, set 74 of oxidizing agent manifolds is positioned adjacent inlet passageway 130 of mixing chamber 16. The lower set 76 of oxidizing agent manifolds is positioned downstream of set 74 and well in advance of outlet passageway 132 of mixing chamber 16. The manifolds 74 and 76 are placed perpendicular to the flow of contaminated air with the oxidizing agent discharge holes 134 facing downstream of the air flow, shown in FIG. 6.

In order to induce highly turbulent flow of the contaminated air for promoting rapid and thorough mixing and to divert or split the stream of the oxidizing agent, so that the induced turbulence can be more effective, sets 136 and 138 of flow interrupters are placed downstream of manifolds sets 74 and 76, respectively. Two other sets 140 and 142 of flow interrupters are positioned upstream and downstream of flow interrupter set 138, respectively, in order to improve thorough mixing of oxidizing agent and contaminated air streams. Preferably, flow interrupter sets 136 and 138 are placed at a short distance from manifold sets 74 and 76, respectively, ranging from about one-half to about twenty-five times the diameter of a manifold in sets 74 and 76.

The exact placement of the flow interrupters 136 and 138 from manifolds sets 74 and 76 is important to divert or split the stream of ozone rich air so that the induced turbulence is more effective. On the other hand, the shape and size of the flow interrupters in sets 136, 138, 140 and 142 is important to induce highly turbulent flow for promoting rapid and thorough mixing of the oxidizing agent (ozone) and the contaminated air. In other words, the shape of the flow interrupters should be selected so as to maximize the pressure gradient between upstream and downstream sides of the interrupters. For most efficient operation, it is preferable to select a shape that has sharp edges yet does not present abnormally high drag coefficients. Some examples of flow interrupters, that produce lower drag coefficients, include chevron-shaped (shown in FIGS. 5 and 6) cylinder, bar, and angled-bar shaped interrupters. It should be noted that although sets of three chevron-shaped flow interrupters are shown as having been placed in the flow passageway 108, it is well within the scope of the invention to vary the number and/or the shapes thereof for inducing different patterns of turbulent flow for promoting mixing of the oxidizing agent and the contaminated air streams. The size of the flow interrupter is a function of the number of ozone manifolds and the manifold size and therefore can be matched with the velocity of air in the flow passageway 108 and the flow pattern of ozone off manifold sets 74 and 76.

PROCESS AND OPERATION

As shown in FIGS. 1 and 7, the contaminated air collected in chamber 10 which, for example, may be a paint booth, is sent to filter mechanism 12 via conduit 22. The air may contain various organic molecules, especially the ones that react generally reluctantly with an oxidizing agent, such as ozone, at room temperature. In particular, the air includes pollutant molecules, such as aromatics, dienes, alkanes, alkenes, alkynes, cycloalkenes, their derivatives, and mixture thereof. The exhaust blower 26 provides sufficient pressure to force the air through the entire system and draws any make-up air needed into chamber 10 from the outside. The filter mechanism 12 traps dirt and other particles from entering into the system. The contaminated air is then blown via conduit 24 to the photoexcitation unit 14. The sensor 30 detects the presence of organic contaminants in the air stream, and feeds into a control unit (not shown) in order to regulate the amount of oxidizing agent injected by generator 18 into the contaminated air stream in mixing chamber 16, as well as the level of radiation required in the photoexcitation unit 14.

The contaminated air entering into unit 14 is exposed to ultraviolet radiation emitted by lamps 78 for a suitable time period. The light sources 78 are preferably linear lamps, placed either parallel or perpendicular to the direction of air flow. Loop serpentine, and flat plate (excimer) light sources can also be used. Preferably, the lamps 78 are placed so as to have their axes perpendicular to the direction of air flow as it provides a simpler system, minimizes air pressure drop due to turbulence and allows for a slightly longer exposure time for each lamp 78.

It is known that many unsaturated hydrocarbons react generally reluctantly with an oxidizing agent at room temperature. This is especially true of benzene ring compounds (aromatic hydrocarbons), and is due to the hydrocarbon molecules having a substantially stable, non-reacting and unexcited molecular energy level state. In the photoexcitation unit 14, the ultraviolet radiation causes the organic pollutant molecules to reach a second substantially unstable, reacting and excited molecular energy level state. The contaminant air stream with the molecules in the excited molecular energy level state is then fed to mixing chamber 16 via conduit 40 where it is exposed to a suitable oxidizing agent, such as ozone, supplied by generator 18. It is critical that the organic pollutant molecules remain in the excited state when being exposed to ozone, which state generally lasts about from $10^{-3}$ to about 10 seconds. Accordingly, the air stream is fed immediately into mixing chamber 16 after photoexcitation in unit 14. In mixing chamber 16, sensor 52 measures the level of ozone concentration in the air stream and sensor 56 detects the level of hydrocarbons therein. The information is fed to the control unit to increase or decrease the output of ozone from manifolds 74 and 76, depending upon the level of hydrocarbons present in the air stream as determined by sensor 56. The contaminated air is thoroughly mixed with ozone in chamber 16 in order to completely oxidize the hydrocarbons present therein.

Figure 6:
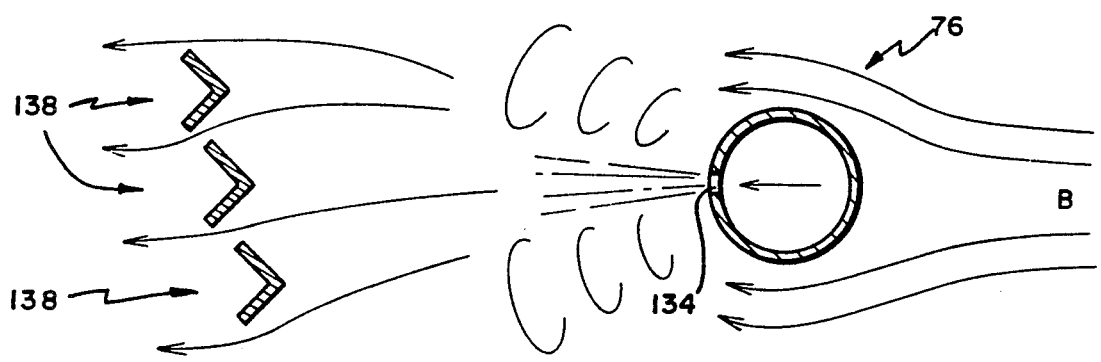
FIG. 6 is a partial enlarged view of one of the passageways in FIG. 5, illustrating the mixing of the fluid and oxidizing agent streams.

As shown in FIGS. 5 and 6, the velocity of the air around manifolds 74 and 76 creates vortices behind the manifolds which ensure proper mixing of the air with the ozone. The ozone injected into the air stream by the manifolds 74 and 76 is mixed with the contaminated air stream, and the thorough mixing thereof is further obtained by the flow interrupter sets 136 and 138. The thoroughly mixed air stream containing the hydrocarbons in the oxidized state is then fed to the ozone destruct unit 20 via conduit 46. One of ordinary skill in the art would be aware that the thoroughly mixed air stream leaving mixing chamber 16, may contain some hydrocarbon molecules in completely unoxidized or partially oxidized state. Therefore, in order to ensure complete oxidation of the hydrocarbon pollutants to carbon dioxide and water, it may be necessary to utilize multiple series of the photoexcitation units and mixing chambers. The output of the lamps would, in that instance, be selected so as to match the absorption spectra of the various unoxidized hydrocarbon molecules.

The ozone destruct unit 20 includes therein a catalytic converter (not shown) that breaks down any excess ozone remaining in the air stream into oxygen. Although not shown, heating units may be provided in unit 20 for more efficient operation of the catalytic converters. The air stream which includes therein hydrocarbons completely broken down into carbon dioxide and water, is then vented to the atmosphere. The sensor 60 detects the presence of any remaining ozone and/or the contaminants and feeds to the system control unit. After a certain predetermined level of either the ozone or the contaminants is reached, the system control unit shuts down the entire apparatus or sounds an alarm.

As one of the ordinary skill in the art would be aware, certain combinations of molecular bonds, known as "chromophores", have a particular absorption wavelength. The width and shape of the absorption band depend upon the particular chromophores and the environmental parameters, such as temperature, pressure, type of solvent or gas, the compound in which it is suspended in, etc. The maximum absorption wavelength level for representative chromophores is shown below in Table I.

TABLE I

LONG WAVELENGTH ABSORPTION OF TYPICAL CHROMOPHORES

| Chromophores | max (A) | max |
|---|---|---|
| C=C | 1,800 | 10,000 |
| C=O | 2,800 | 20 |
| N=N | 3,500 | 100 |
| C=C—C=C | 2,200 | 20,000 |
| C=C—C=C | 3,200 | 100 |
| N=O | 6,600 | 10 |
| Benzene | 2,600 | 200 |

As can be seen from Table I, if a given air stream is contaminated with the organic pollutant molecules, it is important and beneficial to match the absorption wavelengths thereof with the output wavelength of the ultraviolet light source, for a more efficient and complete absorption. For example, if an ultraviolet light source, that emits most of its radiation at a relatively broad wavelength than the peak absorption wavelength of the pollutant molecules, is used, a large fraction of the radiation would be unused and thus wasted. On the other hand, if the light source emits most of its radiation at a wavelength coinciding with the peak absorption wavelength of the pollutant molecules, substantially all of the radiation would be used up to excite most of the molecules. Therefore, it is cost effective to match the maximum output wavelength of the ultraviolet light source with the peak absorption wavelengths of the organic contaminant molecules. Accordingly, it is preferable that the ultraviolet lamps 78 emit radiation at a wavelength from about 100 to about 400 nanometers; and, for certain chromophores such as N=O, visible light sources that emit in the region of 400-700 nanometers may be used. It should also be noted that the above Table I is only exemplary of various chromophores, and it is well within the scope of this invention to treat other chromophores by matching their absorption wavelengths with the wavelengths of other suitable ultraviolet light sources.

Some hydrocarbon pollutants have such a short photoexcitation time that it is impractical to use the air-based system described above. Accordingly, in an alternative method, the pollutants can be first removed from the air stream by a scrubber, water spray, or other conventional means. The pollutant-laden liquid is then injected with ozone and exposed to ultraviolet light. This approach has the advantage of allowing immediate contact between the photoexcited pollutant molecules and the ozone. When the ozone is mixed with water it forms hydroxyl ions which do not absorb ultraviolet light at 254 nanometers. This makes it possible for water soluble hydrocarbons with short photoexcitation time limits to be processed effectively by allowing intimate contact between the reactive hydroxyl ions and hydrocarbons molecules during the photoexcitation process.

While this invention has been described as having a preferred design, it is understood that it is capable of further modifications, uses and/or adaptations of the invention and following in general the principles of the invention and including such departures from the present disclosure as come within known or customary practice in the art to which the present invention pertains, and as may be applied to central features herein before set forth, and fall within the scope of the invention or the limits of the claims appended hereto.

What I claim is:

1. A gas treatment apparatus for removing organic contaminants from a gas containing organic pollutant molecules having the characteristics of reacting generally reluctantly with an oxidizing agent at room temperature, the apparatus comprising:

(a) a contaminated gas collection chamber, a photoexcitation unit, a mixing chamber, and a catalytic bed oxidizing gas destruct unit;

(b) means for exhausting said contaminated gas from said collection chamber and feeding said contaminated gas into said photoexcitation unit;

(c) means for transferring said photoexcited gas into said mixing chamber;

(d) said mixing chamber including means for supplying an oxidizing gas into said mixing chamber for reacting with said photoexcited gas to produce a substantially organic contaminants free gas;

(e) means for transferring said substantially organic contaminants free gas into said catalytic oxidizing gas destruct unit for reacting with a catalyst therein to break down substantially all of any excess oxidizing gas that may exist in said organic contaminants free gas; and (f) means for venting said catalytically treated organic contaminants free gas.

2. The apparatus of claim 1, wherein:

(a) said photoexcitation unit includes first and second chambers; and (b) ultraviolet radiation emitting means disposed in said photoexcitation unit.

3. The apparatus of claim 2, and including:

(a) means for selectively cooling said ultraviolet radiation emitting means.

4. The apparatus of claim 3, wherein:

(a) said ultraviolet radiation emitting means is disposed in said first chamber separated from said second chamber.

5. The apparatus of claim 4, wherein (a) said cooling means comprises a coolant gas for circulating around said ultraviolet radiation emitting means.

6. The apparatus of claim 5, wherein:

(a) said ultraviolet radiation emitting means includes at least one ultraviolet radiation emitting lamp; and (b) an ultraviolet radiation transmitting sleeve disposed in a surrounding relationship to said ultraviolet lamp.

7. The apparatus of claim 2, wherein:

(a) said ultraviolet radiation emitting means is disposed transverse to the flow of said contaminated gas.

8. The apparatus of claim 5 and including:

(a) means for enclosing said mixign chamber and said catalytic bed oxidizing gas destruct unit disposed in a surrounding relationship thereto.

9. The apparatus of claim 8, and including:

(a) means for feeding said coolant gas to within said photoexcitation unit; and (b) means for exhausting said coolant gas from said photoexcitation unit to said enclosing means.

10. The apparatus of claim 9, and including:

(a) means for feeding said coolant gas from said enclosing means to within said catalytic bed oxidizing gas destruct unit for venting to the exterior of the apparatus.

11. The apparatus of claim 1, wherein:
(a) said mixing chamber is located at a distance of from about 0.5 to about 100 feet from said photoexcitation unit.

12. The apparatus of claim 1, wherein:
(a) said mixing chamber includes a retroverted flow passageway;
(b) said oxidizing gas supplying means is positioned in said passageway in a manner that the oxidizing gas is supplied in the flow direction of said photoexcited gas; and
(c) flow interrupter means positioned downstream of sand a short distance from said oxidizing gas supplying means.

13. The apparatus of claim 12, wherein:
(a) said oxidizing gas supplying means comprises a manifold having a diameter; and
(b) said distance between said oxidizing gas supplying means and said flow interrupter means is from about one-half to about twenty-five times the diameter of said manifold.

14. The apparatus of claim 1, wherein:
(a) said photoexcitation unit includes ultraviolet light lamps capable of emitting radiation at a wavelength from about 150 to about 300 nanometers.

15. The apparatus of claim 14, wherein:
(a) each of said light lamps includes a protective quartz tube.

16. The apparatus of claim 1, wherein:
(a) said mixing chamber includes sensor means for measuring the level of said oxidizing gas in said photoexcited gas.

17. The apparatus of claim 1, wherein:
(a) said mixing chamber includes sensor means for measuring the level of organic contaminants in said substantially organic contaminants free gas.

18. The apparatu sof claim 12, wherein:
(a) said flow interrupter means includes a generally chevron-shaped member.

19. The apparatus of claim 1, wherein:
(a) said contaminated gas exhausting means includes sensor means for measuring the level of organic contaminants in said contaminated gas.

20. The apparatus of claim 1, and including:
(a) sensor means for measuring the level of any residual oxidizing gas in said catalytically treated organic contaminants free gas.

* * * * *